Jan. 23, 1962 D. T. MORABITO 3,017,652
WASTE COLLECTING DEVICE
Filed March 24, 1961

INVENTOR.
Daniel T. Morabito
BY 3,017,652
WASTE COLLECTING DEVICE
Daniel T. Morabito, Post Road, Sudbury, Mass.
Filed Mar. 24, 1961, Ser. No. 98,224
3 Claims. (Cl. 15—257.5)

The present invention relates to a waste collecting device.

A primary object of the invention is the provision of waste collecting means for the deposit of waste paper as well as floor accumulated dirt without a stooping effort as is occasioned by the common use of a dust pan.

A further object of the invention is the provision of a manually operable dirt collecting and lifting device in operative association with an easily transported trash collecting means.

A still further object of the invention is the provision of a transportable waste collecting device of box-like form having an open top end for the admission of waste paper and the like, and having also an opening in a side wall for admission of floor sweepings and wherein means are provided for urging the waste paper toward the back wall of the collecting device while the floor sweepings are urged toward the bottom wall of the waste collecting device.

A still further object of the invention is the provision of a waste collecting device embodying a box-like structure having an opening in a side wall adjacent the bottom wall thereof and a sweepings loader of generally rectangular form having an edge thereof pivotally supported by the box-like structure adjacent the lower edge of said opening, and the sweepings loader having means for avoiding the retreat of waste when being admitted thereto, as by the use of a broom.

Other objects and advantages of the invention will become apparent in the course of the following detailed description, taken in connection with the accompanying drawing, wherein—

Figure 1:
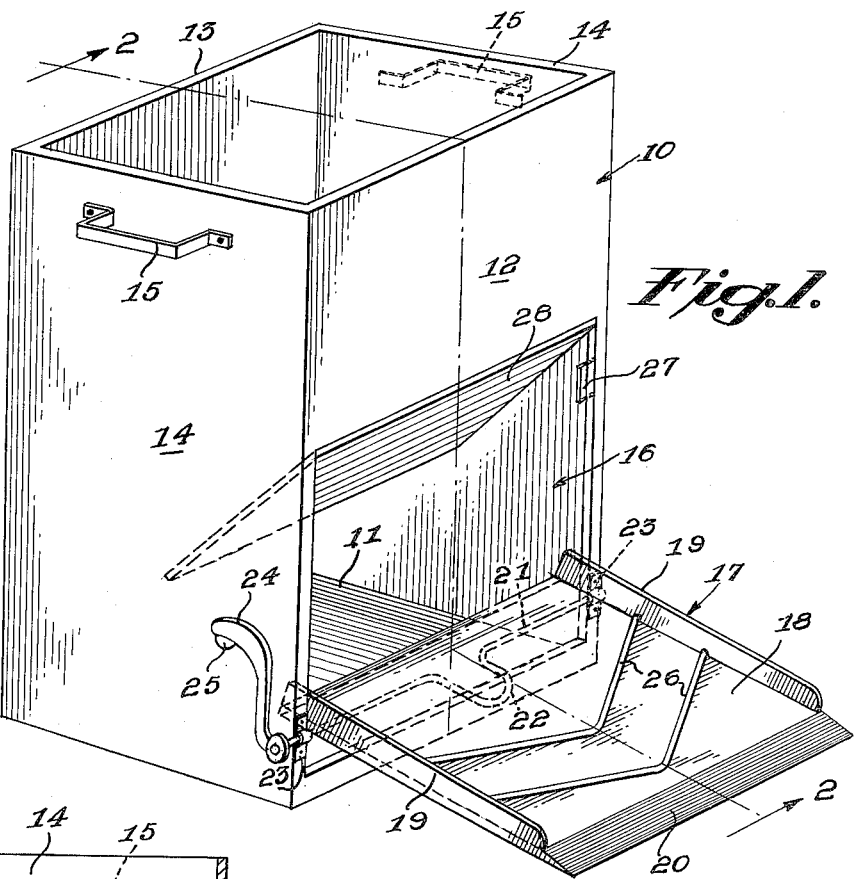
FIG. 1 is a perspective view of the improved waste collecting device with the side wall opening exposed for the reception of floor sweepings.

Referring now in detail to the drawing, the improved waste collecting device will be seen to comprise a rectangular box 10 defined by a horizontal bottom wall 11, a front vertical side wall 12, a rear vertical side wall 13, and opposite side vertical walls 14.

The box may be of any light durable material and of such desired dimensions as to provide for the collection of a substantial volume of sweepings and waste paper or the like, and in order to transport the box same is preferably provided with a pair of suitable handles 15, as is clearly indicated in FIG. 1.

While the vertical side walls 14 and the back wall 13 are of the full height of the box 10, the front vertical wall 12 has the upper edge thereof horizontally aligned with the upper edges of the walls 13 and 14, while the lower edge thereof is disposed intermediate the top and bottom of the box thereby providing a rectangular opening 16 for the admission of floor sweepings into the box, and a sweepings loader 17 of generally rectangular form is provided and which comprises a base member 18 and a pair of forwardly tapering relatively shallow side walls 19 for confining sweepings when being swept through the opening 16 and into the box 10. The loader 17 further comprises a front bevelled edge 20.

The loader 17 is pivotally secured to the box 10 and such is preferably accomplished by means of a rod 21 suitably secured to the lower face of the base member 18 and which may include a strengthening U-bend portion 22 intermediate the ends thereof.

Figure 2:
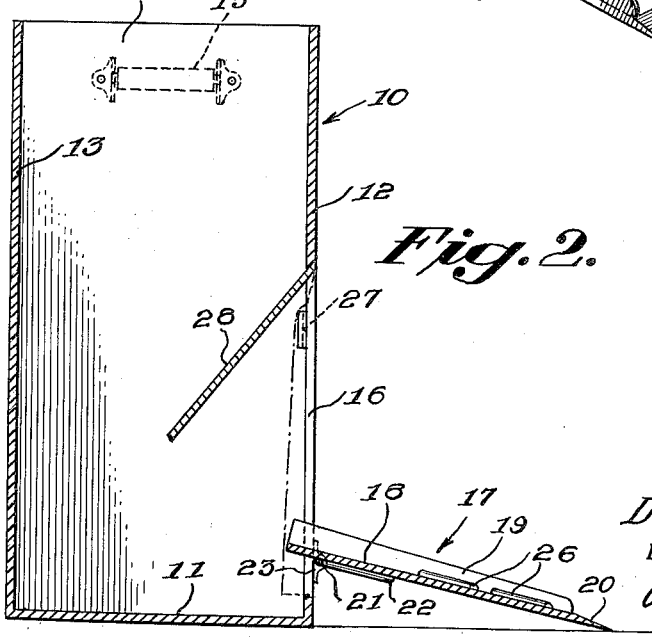
FIG. 2 is a vertical sectional view as observed in the plane of the broken line 2—2 on FIG. 1, with the said side wall opening shown in closed position by dotted lines.

A pair of pivot brackets 23 are secured to the exposed edges of the side walls 14 and in which the rod 21 is supported for rotation about its axis whereby upon rotation of the rod the loader 17 may be rotated about the axis of the rod to its opening and closing positions, the latter of which is indicated by dotted lines in FIG. 2.

The rod 21 at one end thereof and exteriorly of a side wall 14 is provided with a foot lever 24 having a counter weight 25 whereby upon downward movement thereof under foot pressure of an operator, the loader 17 is moved to a generally vertical position wherein the opening 16 is closed, as is indicated by dotted lines in FIG. 2, for confinement of sweepings within the box 10.

In order to avoid retreat of sweepings when being broomed over the loader 17 toward the opening 16, the base member 18 is preferably provided with transversely convex ribs 26 which, as shown in FIG. 1, are preferably of wide V-form.

The loader 17 is preferably retained in closed position by means of a magnetic catch 27.

A baffle 28 is disposed at the upper edge of the opening 16 and which extends into contact with the side walls 14 and the baffle extends downwardly from said upper edge of opening 16 to a position intermediate the front and rear walls 12 and 13 and with its lower edge disposed substantially in a plane intermediate the upper and lower edges of opening 16 whereby sweepings are urged downwardly toward the bottom and rear walls 11 and 13 of the box.

The baffle 28 further acts to urge waste paper or the like admitted through the top opening in the box rearwardly so as not to interfere with the operation of the loader 17.

Having set forth the invention in accordance with a preferred structural embodiment thereof, what is claimed and desired to be secured by U.S. Letters Patent is:

1. A transportable waste collecting device, comprising a rectangular open top box having a horizontal bottom wall and right angularly disposed vertical side walls, a back wall and a front wall, said front wall being provided with a rectangular opening whose upper horizontal edge is disposed substantially intermediate the said bottom wall and the top of the box, a sweepings loader of generally rectangular form pivotally supported adjacent one edge thereof with opposed side walls of said box adjacent the lower edge of said rectangular opening, a foot lever engaged with one end of said pivotal support and being disposed adjacent the outer face of one of said side walls for swinging said sweepings loader with a resulting control of said opening, a rectangular baffle having one edge thereof secured to said one of said side walls at the upper edge of said rectangular opening in said front wall, said baffle extending downwardly from said edge thereof into the box with the free edge thereof disposed substantially midway of said one of said side walls and an opposing side wall, and said free edge being disposed above and in spaced relation to said horizontal bottom wall.

2. A transportable waste collecting device according to claim 1, wherein the free edge of said baffle is disposed substantially intermediate said one of said side walls and an opposing side wall and wherein said free edge of the baffle is further disposed intermediate said bottom wall and said upper horizontal edge of said rectangular opening.

3. A transportable waste collecting device according to claim 1, wherein said sweepings loader comprises a rectangular base member having a shallow side wall at each edge thereof, and a bevelled front edge, and said base member being provided with transversely convex ribs which are of relatively wide V-form with the apices thereof disposed in a vertical plane intermediate said side walls.

References Cited in the file of this patent
UNITED STATES PATENTS

| | | |
|---|---|---|
| 642,412 | Anderson | Jan. 30, 1900 |
| 2,164,407 | Jarchow | July 4, 1939 |
| 2,601,069 | Strumbos | June 17, 1952 |
| 2,956,828 | Clark | Oct. 18, 1960 |